United States Patent
Hayashi et al.

(10) Patent No.: US 9,361,552 B2
(45) Date of Patent: Jun. 7, 2016

(54) IMAGE DETECTION APPARATUS AND IMAGE FORMING APPARATUS

(71) Applicant: Konica Minolta, Inc., Chiyoda-ku, Tokyo (JP)

(72) Inventors: Kenichi Hayashi, Hino (JP); Katsunori Takahashi, Hachioji (JP); Tatsuhiro Noutomi, Hachioji (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 14/829,736

(22) Filed: Aug. 19, 2015

(65) Prior Publication Data
US 2016/0063361 A1 Mar. 3, 2016

(30) Foreign Application Priority Data

Aug. 26, 2014 (JP) ................. 2014-171402

(51) Int. Cl.
*G03G 15/00* (2006.01)
*G06K 15/12* (2006.01)
*H04N 1/60* (2006.01)
*G06K 15/02* (2006.01)

(52) U.S. Cl.
CPC ............ *G06K 15/129* (2013.01); *G06K 15/027* (2013.01); *H04N 1/6044* (2013.01)

(58) Field of Classification Search
CPC . G03G 15/5062; G03G 15/00; G03G 15/234; G03G 15/0105; G03G 15/2028
USPC .......................................................... 399/15
See application file for complete search history.

(56) References Cited

U.S. PATENT DOCUMENTS 8,594,517 B2 * 11/2013 Usui ...................... G03G 15/00
358/1.9
2012/0050771 A1 * 3/2012 Sakatani ............ G03G 15/0131
358/1.9

FOREIGN PATENT DOCUMENTS

JP 2008-8967 A 1/2008

OTHER PUBLICATIONS

Machine translation of Okazaki JP 2008-008967 A, publication date: Jan. 17, 2008.*

* cited by examiner

*Primary Examiner* — Walter L Lindsay, Jr.
*Assistant Examiner* — Frederick Wenderoth
(74) *Attorney, Agent, or Firm* — Buchanan Ingersoll & Rooney PC

(57) ABSTRACT

An improved image detection apparatus is described which can colorimetrically measure an appropriate number of patches while inhibiting unnecessary sheet discharging. A correction chart consists of a plurality of patches linearly arranged in the form of a plurality of patch arrays which are parallelly arranged in the sheet width direction. The image detection apparatus includes a paper conveying unit for conveying a sheet on which the correction chart is formed, an image reading unit and a colorimetric unit which outputs the color information of each patch by performing the colorimetric process with the patch array consisting of a line of the patche. Then, while circulating a sheet, a control unit performs switch control for switching the patch array from one to the next to be colorimetrically measured by the colorimetric unit.

20 Claims, 7 Drawing Sheets

(first-round conveyance)

(second-round conveyance)

Fig. 4
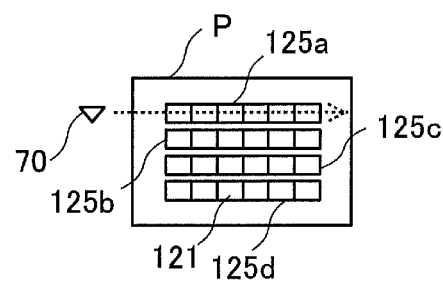
(first-round conveyance)
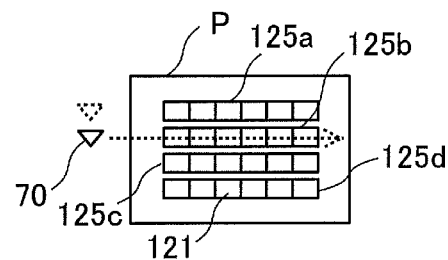
(second-round conveyance)

Fig. 5
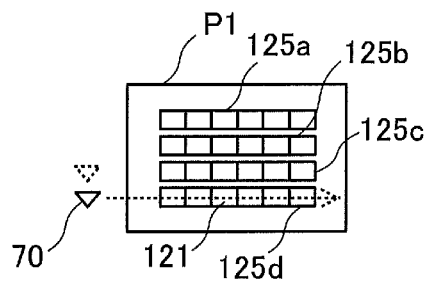
(first sheet: fourth-round conveyance)
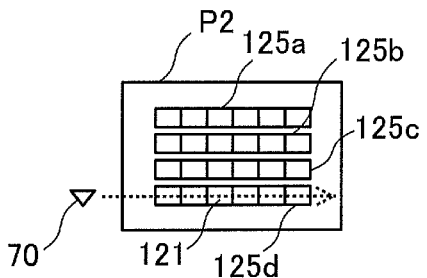
(second sheet: first-round conveyance)
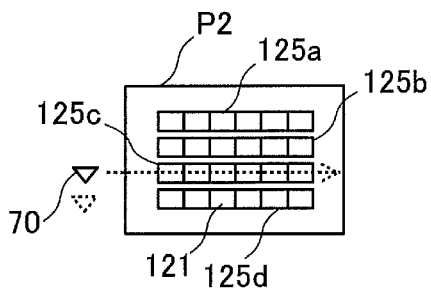
(second sheet: second-round conveyance)

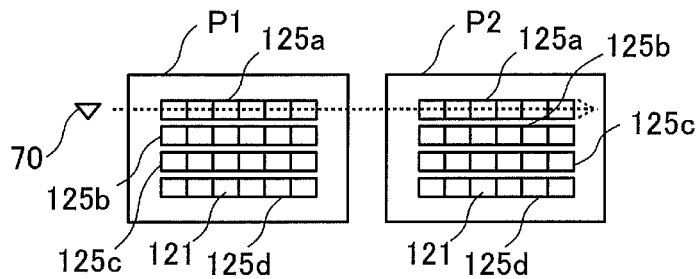
Fig. 6 (first-round conveyance)
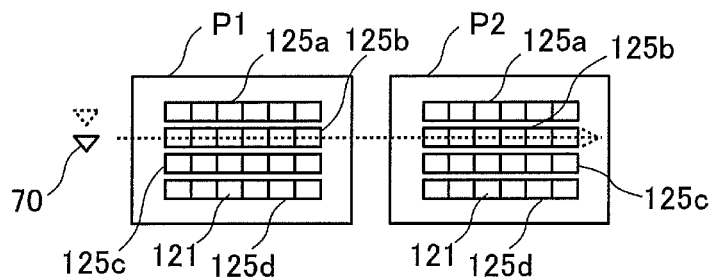
(second-round conveyance)
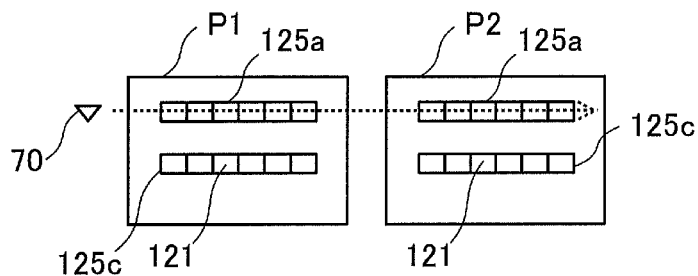
Fig. 7 (first-round (front side) conveyance)
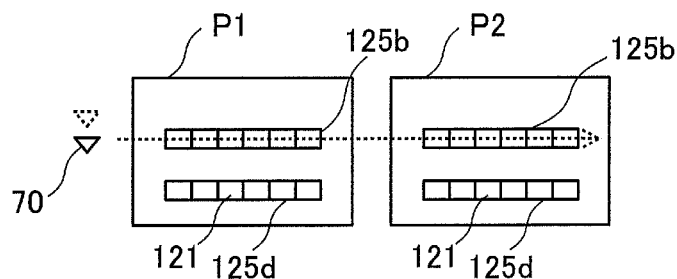
(second-round (back side) conveyance)

Fig. 8
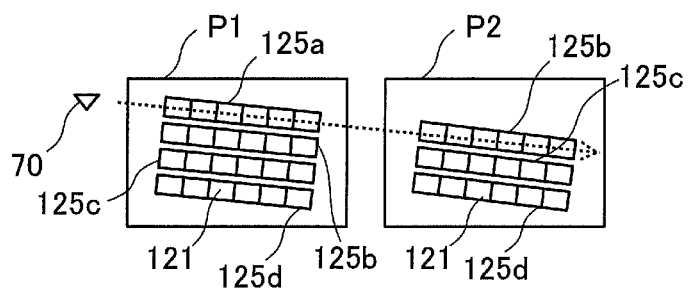
Fig. 9
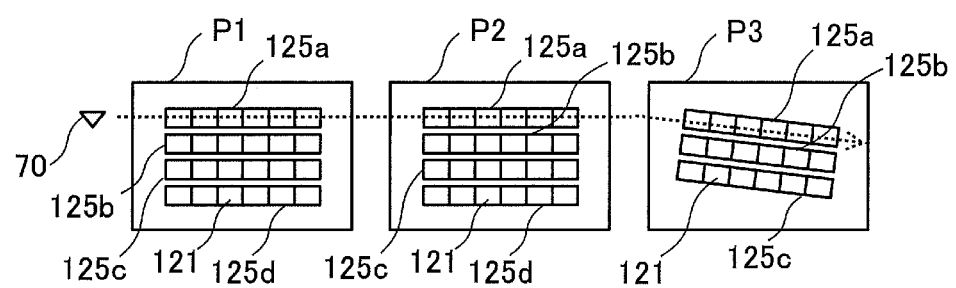
(first-round conveyance)
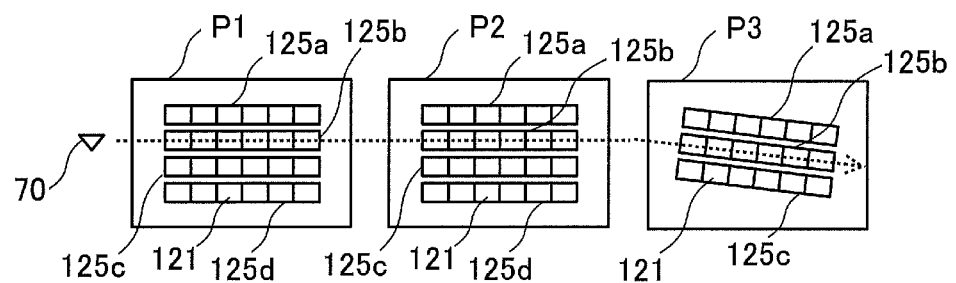
(second-round conveyance)

Fig. 10
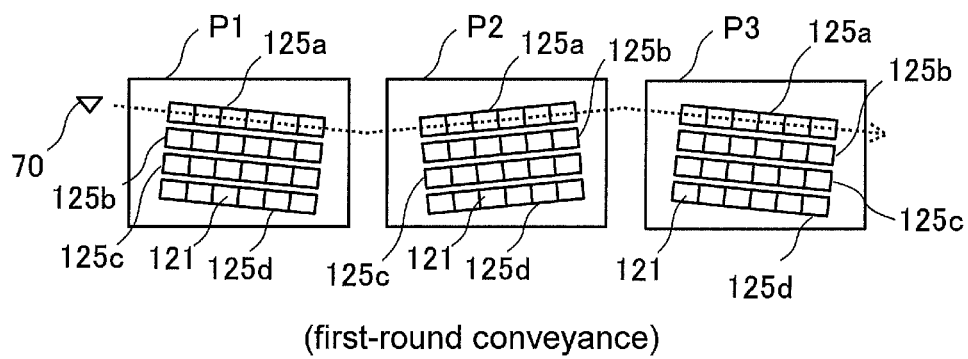
(first-round conveyance)
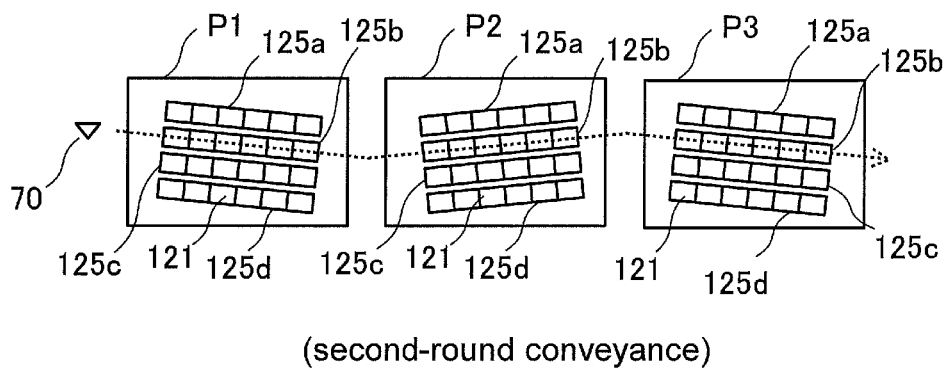
(second-round conveyance)

IMAGE DETECTION APPARATUS AND IMAGE FORMING APPARATUS

CROSS-REFERENCE TO RELATED APPLICATIONS

The present application claims priority under 35 U.S.C. §119 to Japanese Patent Application No. 2014-171402, filed Aug. 26, 2014. The contents of this application are herein incorporated by reference in their entirety.

BACKGROUND OF THE INVENTION

1. Field of the Invention

The present invention relates to an image detection apparatus and an image forming apparatus.

2. Description of the Related Art

Conventionally, an image detection apparatus is known which optically detects a correction chart in which many patches having different colors and densities are arranged for the purpose of correcting the color or the like characteristics of an image forming apparatus.

This image detection apparatus may be incorporated in the image forming apparatus as an internal unit to perform its functionality, or may be another device connected to the body of the image forming apparatus.

For example, Japanese Patent Published Application No. 2008-8967 discloses a color image forming apparatus having a capability of correcting color characteristics. In the case of this color image forming apparatus, since there is a difference between the front and back sides of a sheet in the degree of correction, different correction charts are provide respectively for the opposite sides in order to generate the correction data in accordance with the fixing history of the sheet. Also, in the case where the correction chart for front side and the correction chart for back side are formed to overlap in the plane of paper, i.e., where color patches for back side is formed just in back of color patches for front side with the sheet material therebetween, the information of the image (color patches) in the back side can be included in the information detected by a color sensor. Because of this, there is a problem that the correction accuracy may be degraded. In order to deal with this problem, this color image forming apparatus is structured to form correction charts on the front and back sides of a sheet respectively in such positions as not to overlap each other. When detecting the correction chart on the back side after detecting the correction chart on the front side, the color sensor is shifted to avoid overlapping. Each correction chart described in Japanese Patent Published Application No. 2008-8967 consists of a plurality of patches which are linearly arranged as a patch array in the direction of conveying sheets.

In accordance with the technique described in this publication, however, only two patch arrays are detected for the front and back sides respectively. In addition to this, since the patch array formed on the front side is of the same type as the patch array formed on the back side, it actually means that only one patch array is effectively detected. So far, high picture quality is required of image forming apparatuses, and thereby it is important to detect a number of color patches corresponding to several hundreds through 1600 colors and the like. However, in the case where such a very large number of color patches are linearly formed, a large number of sheets have to be used and uselessly discarded, resulting in an unfavorable situation.

Taking into consideration the above circumstances, it is an object of the present invention therefore to provide an image detection apparatus and an image forming apparatus which can colorimetrically measure an appropriate number of patches while inhibiting unnecessary sheet discharging.

SUMMARY OF THE INVENTION

To achieve at least one of the above-mentioned objects, reflecting one aspect of the present invention, an image detection apparatus comprises: a paper conveying unit structured to convey a sheet on which a correction chart is formed with a plurality of patch arrays which are arranged in the direction perpendicular to a sheet conveying direction, each of the patch arrays consisting of a plurality of patches which are linearly arranged; a colorimetric unit located to face the sheet which is conveyed by the paper conveying unit and structured to perform colorimetric measurement of a part of the plurality of patch arrays of the correction chart and output color information of each patch included in the part of the plurality of patch arrays as colorimetric data; and a control unit structured to control the paper conveying unit and the colorimetric unit. In this case, the paper conveying unit includes a re-conveying route structured to circulate the sheet, which has been passed through the colorimetric unit, to the colorimetric unit again, and wherein the control unit is structured to perform switch control for switching the patch array to be colorimetrically measured while circulating the sheet through the re-conveying route.

In an embodiment, the image detection apparatus further comprises an image reading unit located to face the sheet which is conveyed by the paper conveying unit, and structured to read the sheet and output an image of the correction chart as read data. Preferably, in this case, the control unit is structured to correct an output characteristic of the image reading unit based on the colorimetric data which is output from the colorimetric unit.

Also, in a preferred embodiment, the paper conveying unit is structured to circulate one or more sheets in a row in accordance with the number of sheets to be circulated together. Preferably, in this case, the control unit is structured to perform the switch control each time the number of sheets to be circulated together are circulated.

Furthermore, in a preferred embodiment, the paper conveying unit is structured to further perform operation of reversing the front and back sides of each sheet while circulating the sheets to be circulated together.

Still further, in a preferred embodiment, the switch control is structured to successively switch the patch array from one to the next to be colorimetrically measured by the colorimetric unit by moving at least either of the colorimetric unit and the sheets in the direction perpendicular to the sheet conveying direction.

Still further, in a preferred embodiment, each of the sheets to be circulated together is provided with a correction chart consisting of a plurality of patch arrays parallelly aligned in the sheet conveying direction. Preferably, in this case, the control unit is structured to move at least either of the colorimetric unit and the sheets stepwise each time the number of sheets to be circulated together is circulated.

Still further, in a preferred embodiment, when repeating a process of successively circulating the number of sheets to be circulated together, the control unit controls the sheet interval between a last sheet and the first sheet that is subsequent to the last sheet.

Still further, in a preferred embodiment, of the number of sheets to be circulated together, one or more sheets are provided with a correction chart consisting of a plurality of patch arrays inclined to the sheet conveying direction. Preferably, in this case, the control unit is structured to continuously move the colorimetric unit along the inclined patch array to successively switch the patch array to be colorimetrically measured.

BRIEF DESCRIPTION OF THE DRAWINGS

FIG. 4 is an explanatory view for schematically showing the colorimetric process in the case where sheets are circulated one after another.

FIG. 5 is an explanatory view for showing the reciprocating motion of the colorimetric unit to repeat the colorimetric process.

FIG. 6 is an explanatory view for showing a colorimetric process in the case where sheets are paired and circulated together in accordance with a second embodiment.

FIG. 7 is an explanatory view for showing the colorimetric process in the case where sheets are paired and circulated together while the patch arrays of the correction chart are separately formed on the front and back sides of the sheets in accordance with a third embodiment.

FIG. 8 is an explanatory view for showing a colorimetric process in the case where sheets are paired and circulated together and provided with patch arrays inclined in relation to the sheet conveying direction in accordance with a fourth embodiment.

FIG. 9 is an explanatory view for showing a colorimetric process in the case where three sheets are circulated together and provided with a patch array inclined in relation to the sheet conveying direction in accordance with a fifth embodiment.

FIG. 10 is an explanatory view for showing a colorimetric process in the case where three sheets are circulated together and consists of patch array inclined in relation to the sheet conveying direction in accordance with the fifth embodiment.

DETAILED DESCRIPTION OF THE PREFERRED EMBODIMENT

First Embodiment

Figure 1:
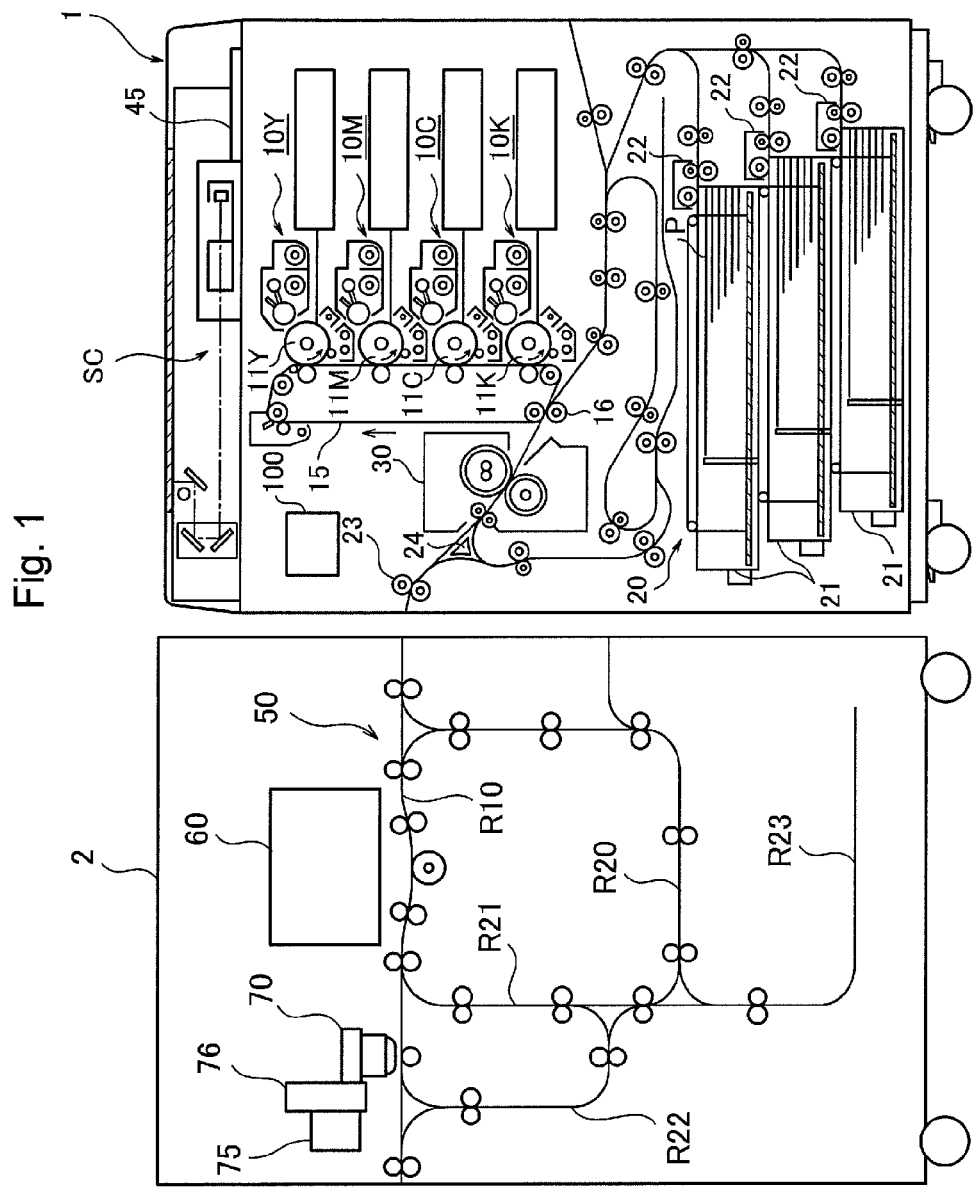
FIG. 1 is an explanatory view for schematically showing the configuration of an image forming apparatus in accordance with a first embodiment.

FIG. 1 is an explanatory view for schematically showing the configuration of an image forming apparatus in accordance with a first embodiment. The image forming apparatus includes an image forming apparatus body 1, an image detection apparatus 2 and a control unit 100.

This image forming apparatus body 1 is an electrophotographic image forming apparatus 1 called a tandem color image forming apparatus. The tandem color image forming apparatus includes a plurality of photoreceptor drums vertically arranged in contact with one intermediate transfer belt to form full-color images. This image forming apparatus body 1 consists mainly of an original reading unit SC, four image forming units 10Y, 10M, 10C and 10K and a fixing unit 30.

The original reading unit SC scans and exposes the image of an original with an optical system of a scanning exposing device, and reads the reflected light therefrom with a line image sensor to obtain image signals. The image signals are processed by performing A/D conversion, shading compensation, data compression and so on, and input to the control unit 100 as image data. Incidentally, the image data input to the control unit 100 is not limited to the image data as captured by the original reading unit SC, but can be the data for example as received from another image forming apparatus body, a personal computer or the like connected to the image forming apparatus body, or stored in a portable recording medium such as a semiconductor memory.

These four image forming units 10Y, 10M, 10C and 10K are an image forming unit 10Y for forming yellow (Y) images, an image forming unit 10M for forming magenta (M) images, an image forming unit 10C for forming cyan (C) color images, and an image forming unit 10K for forming black (K) images. The image forming units 10Y, 10M, 10C and 10K consist of photoreceptor drums 11Y, 11M, 11C and 10K respectively, each of which is provided therearound with a charging unit, an optical writing unit, a development apparatus and a drum cleaner.

The surfaces of the photoreceptor drums 11Y, 11M, 11C and 11K are uniformly charged with electricity by the charging units, and the optical writing units perform a scanning exposure process to form latent images on the photoreceptor drums 11Y, 11M, 11C and 11K respectively. The development apparatuses then make visible the latent images on the photoreceptor drums 11Y, 11M, 11C and 11K respectively by developing the images with toners. Predetermined color images (toner images) are thereby formed on the photoreceptor drums 11Y, 11M, 11C and 11K respectively corresponding to yellow, magenta, cyan and black. The toner images formed on the photoreceptor drums 11Y, 11M, 11C and 11K are transferred to a predetermined location of an intermediate transfer belt 15 through first transfer rollers.

After transferred to the intermediate transfer belt 15, the toner images are transferred by a second transfer roller 16 to a sheet P conveyed with a predetermined timing by a paper feed unit 20 to be described below. The second transfer roller 16 is located in contact with the intermediate transfer belt 15 under pressure to form a nip portion therebetween.

The paper conveying unit 20 conveys sheets P which is fed from a paper feed unit 21 along a conveying route. In the paper feed unit 21, sheets P are stored in paper feed trays, extracted from the paper feed trays by paper feeding devices 22 and transferred to the conveyance route by paper feed units 22. There are a plurality of paper conveyance units in the conveying route for conveying sheets P. Each conveyance unit consists of a pair of rollers which are urged against each other. At least one of the pair of rollers is rotated by a drive mechanism consisting of an electric motor. Meanwhile, in place of a pair of rollers, any other appropriate combination such as a combination of belts, a combination of a belt and a roller or the like combination can be used as a pair of rotary members serving as a conveyance unit.

The fixing unit 30 is an apparatus which performs a fixing process for a sheet P to which an image has been transferred. The fixing unit 30 consists, for example, of a pair of fixing rollers urged against each other to form a fixing nip portion therebetween, and a heater for heating one or both of the fixing rollers. This fixing unit 30 fixes an image to a sheet P under the pressure applied between the pair of fixing rollers and the heat applied through the fixing rollers. After the fixing unit 30 processes the sheet P by the fixing treatment, the sheet P is discharged outwards by discharging rollers 23.

In the case where an image is to be formed also on the back side of a sheet P, the sheet P with the image formed on the front side is conveyed to a refeed conveying route through a switching gate 24. The refeed conveying route includes reversing rollers which hold the tail end of the conveyed sheet P and then reverses the sheet P by sending back it to reverse the front and back sides of the sheet P. After reversing the front and back sides, the sheet P is conveyed by a plurality of conveyance rollers and joined with a conveying route in the upstream side of the transfer site for the purpose of supplying the sheet P to form an image on the other side.

The operation panel 45 is an input unit in the form of a touch panel through which information can be input in accordance with information displayed on a display. A user can set a variety of parameters such as information about sheet P, the density and reduce/enlarge ratio of images and selection of a paper tray to be used as a paper supply source by operating the operation panel 45. These settings are acquired by the control unit 100. Also, the operation panel 45 is controlled by the control unit 100 and functions also as a display unit through which the user can be informed of various items of information for reference.

The image detection apparatus 2 is located in the downstream side of the image forming apparatus body 1. When receiving a sheet P supplied from the image forming apparatus body 1, this image detection apparatus 2 detects a correction chart formed on this sheet P. The detection result of the correction chart is output to the control unit 100 of the image forming apparatus body 1.

Figure 2:
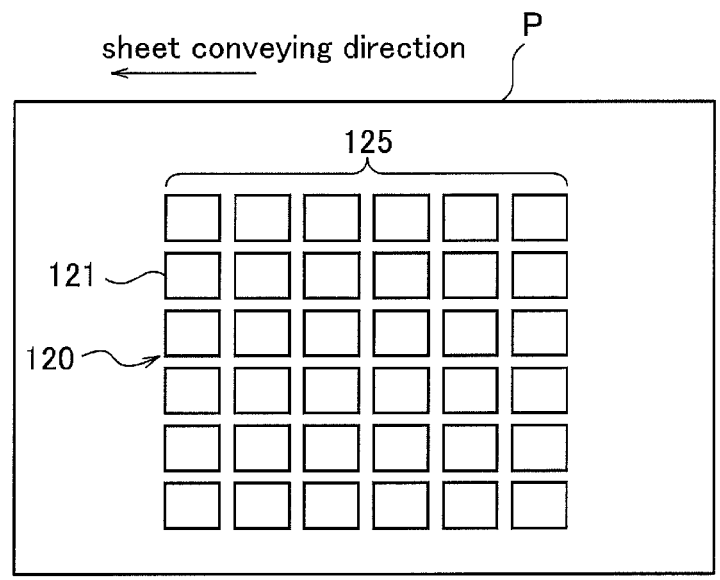
FIG. 2 is an explanatory view for showing an example of a correction chart.

FIG. 2 is an explanatory view for showing an example of the correction chart 120. The correction chart 120 of FIG. 2 consists of a plurality of patches 121 which are monochromatically illustrated in the figure but actually colored as described below. The plurality of patches 121 of the correction chart 120 are linearly arranged in the form of a plurality of patch arrays 125 which are parallelly arranged in the direction (hereinafter referred to as "the sheet width direction") perpendicular to the sheet conveyance direction. Each patch array 125 consists of a plurality of the patches 121 which are linearly aligned in the sheet conveying direction.

Each patches 121 of the correction chart 120 is formed by overlapping all the chromatic colors of the element colors of the image forming apparatus body 1 at a prescribed ratio, which is varied from patch to patch to implement a stepwise change in the density of each chromatic color. For example, in the case where the element colors of the image forming apparatus body 1 are cyan (C), magenta (M), yellow (Y) and black (K), the patches 121 are formed by combining cyan (C), magenta (M) and yellow (Y) respectively at varying ratios in a range of 0% to 100%, excluding black (K) which is an achromatic color.

The image detection apparatus 2 includes a paper conveying unit 50, an image reading unit 60 and a colorimetric unit 70.

The paper conveying unit 50 conveys a sheet P which is fed from the image forming apparatus body 1. This paper conveying unit 50 includes a first conveying route R10 for conveying and discharging outwards the sheet P received from the image forming apparatus body 1, and a second conveying route R20 for circulating the sheet P to a predetermined position of the first conveying route R10. The second conveying route R20 is connected with a first branch route R21 through which a sheet P passed through the image reading unit 60 on the first conveying route R10 is conveyed to the second conveying route R20, and a second branch route R22 through which a sheet P passed through the colorimetric unit 70 on the first conveying route R10 is conveyed to the second conveying route R20.

The branching position between the first branch route R21 the first conveying route R10 is provided with a switch gate which is not shown in the figure in order to guide a sheet P conveyed on the first conveying route R10 to the first branch route R21 in accordance with the switching position of the switch gate. These first branch route R21 and second conveying route R20 provide the re-conveying route through which a sheet P passed through the image reading unit 60 is circulated and returned to the image reading unit 60.

Also, the branching position between the second branch route R22 and the first conveying route R10 is provided with a switch gate which is not shown in the figure in order to guide a sheet P conveyed on the first conveying route R10 to the second branch route R22 in accordance with the switching position of the switch gate. These first branch route R22 and second conveying route R20 provide the re-conveying route through which a sheet P passed through the colorimetric unit 70 is circulated and returned to the image reading unit 60 and the colorimetric unit 70.

The second conveying route R20 is connected also to a switchback route R23 for reversing the front and back sides of a sheet P to be circulated.

These conveying routes R10 and R20 to R23 are provided with paper conveying mechanisms for conveying a sheet P. Each conveyance unit consists of a pair of rollers which are urged against each other, and at least one of the pair of rollers is rotated by a drive mechanism consisting of an electric motor. Meanwhile, in place of a pair of rollers, any other appropriate combination such as a combination of belts, a combination of a belt and a roller or the like combination can be used as a pair of rotary members serving as a conveyance unit.

The image reading unit 60 is located to face a sheet P which is conveyed on the first conveying route R10, and structured to read a correction chart 120 formed on the sheet P. The image reading unit 60 consists of a light source for irradiating a sheet P which is passed through a reading position, and a line image sensor consisting of a plurality of imaging devices which are linearly arranged in the sheet width direction to photoelectrically convert light reflected from the sheet P in correspondence with picture elements respectively. The reading area of the image reading unit 60 is determined to cover the maximum width of sheets P which can be transferred from the image forming apparatus body 1. The image reading unit 60 reads the correction chart 120 formed on a sheet as a two-dimensional image P by repeating operation (reading process) of reading image data from one line along the sheet width direction in synchronization with the operation of conveying the sheet P which is passed through the reading position. The image corresponding to the correction chart 120, which is read, is generated as read data and output to the control unit 100.

The colorimetric unit 70 is arranged to face a sheet P which is conveyed on the first conveying route R10, and located in the downstream side of the image reading unit 60 on the first conveying route R10. The colorimetric unit 70 is structured to measure color information of each of the patches 121 included in the correction chart 120. The colorimetric range (corresponding to the viewing angle) of the colorimetric unit 70 is narrower than the reading area of the image reading unit 60, and determined to be narrower than the width of the patches 121 (the width of sheets) in the case of the present embodiment. The colorimetric unit 70 can measure the color information with higher accuracy than the image reading unit 60 by performing a colorimetric measurement within a limited range of viewing angle. The colorimetric unit 70 performs the colorimetric process by repeating the colorimetric measurement from one to the next of the patches 121 included in the correction chart 120 in synchronization with the operation of conveying a sheet P passing through the measurement position. The colorimetric measurement result of each patch 121 is generated as numeric values (colorimetric data) which are represented by a predetermined color model, and output to the control unit 100. Incidentally, each patch 121 is a constituent element of the correction chart 120, and shaped into a rectangle which is elongated in the sheet conveying direction for the purpose of improving the measurement accuracy of the colorimetric unit 70.

Figure 3:
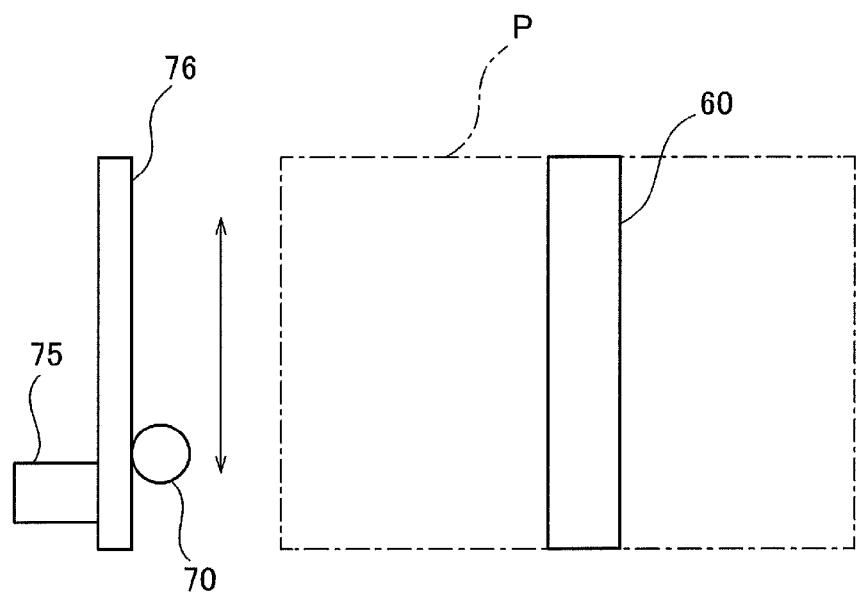
FIG. 3 is an explanatory view for schematically showing the motion of a colorimetric unit.

FIG. 3 is an explanatory view for schematically showing the motion of the colorimetric unit 70. In this case, it is one of the characteristic features of the present embodiment that the colorimetric unit 70 is provided with a drive unit 75 such as an electric motor. This drive unit 75 is connected to the colorimetric unit 70 through a power transmission system 76 such as gears, and capable of moving the colorimetric unit 70 in the sheet width direction by transmitting the power of the drive unit 75 through the power transmission system 76. The colorimetric unit 70 is moved under the control of the control unit 100.

The control unit 100 controls the operation of the image forming apparatus. The control unit 100 is implemented with a microcomputer which consists mainly of a CPU, a ROM, a RAM, and an I/O interface. This control unit 100 controls the image forming apparatus body 1 to perform the image forming operation, and controls the image detection apparatus 2 to perform an image detection process.

In the case of the present embodiment, when calibration is carried out, the control unit 100 controls the image forming apparatus body 1 to form the correction chart 120 on the sheet P. The number of sheets P, on which the correction chart 120 is to be formed, is determined in accordance with the number of colors to be measured.

The sheet P on which the correction chart 120 is formed is discharged from the image forming apparatus body 1 and fed to the image detection apparatus 2. The sheet P travels the first conveying route R1 and arrives at a predetermined conveying position (reading position) where the image reading unit 60 performs a reading process. By this reading process, an image corresponding to the correction chart 120 is generated as read data and output to the control unit 100.

Likewise, when the sheet P arrives at a predetermined conveying position (colorimetric measurement position), the colorimetric unit 70 performs a colorimetric process. Since the colorimetric range of the colorimetric unit 70 is narrower than the width of one patch 121, as has been discussed above, only one patch array 125 can be colorimetrically processed when passing the sheet P through the first conveying route R10 once.

After a sheet P is passed through the colorimetric unit 70, thereby, the control unit 100 of the present embodiment circulates the sheet P by the use of the second branch route R22 and the second conveying route R20. When the sheet P at a second-round is passed through the first conveying route R10, the colorimetric unit 70 performs a colorimetric measurement on a patch array 125 which is different from the patch array 125 which has been processed in a first-round. The sheet P is thereafter repeatedly circulated a predetermined number of times corresponding to the number of the patch arrays 125 so that all the patch arrays 125 formed on one sheet P are colorimetrically measured. Namely, while circulating the sheet P, the control unit 100 performs switch control for switching the patch array 125 from one to the next to be colorimetrically measured by the colorimetric unit 70. Colorimetric data can be acquired by this colorimetric process and output to the control unit 100.

Next, a specific example of the colorimetric process will be explained in the case where sheets P are circulated one after another. FIG. 4 is an explanatory view for schematically showing the colorimetric process in the case where sheets P are circulated one after another. In this example shown in the same figure, the correction chart 120 consists of four patch arrays 125*a* to 125*d* formed on one side of a sheet and aligned respectively in the sheet conveying direction. Each of the patch arrays 125*a* to 125*d* consists of six patches 121 which are aligned with the sheet conveying direction.

First, the control unit 100 sets up the colorimetric unit 70 in a predetermined starting position. This starting position corresponds to the position of an arbitrary one of the patch arrays 125*a* to 125*d* of the correction chart 120 formed on the sheet P. In this example shown in the same figure, the starting position is the position of the first patch array 125*a* which is located at the endmost position of the four patch arrays 125*a* to 125*d*.

The control unit 100 conveys a sheet P on the first conveying route R10 (first-round conveyance). When the sheet P is passed through the colorimetric unit 70 during the first-round conveyance, the colorimetric unit 70 performs the colorimetric measurement of the first patch array 125*a* which is located just below the colorimetric unit 70. By this process, the colorimetric data (color information) of the six patches 121 contained in the first patch array 125*a* is generated.

The control unit 100 then circulates the sheet P from the second branch route R22 to the first conveying route R10 through the second conveying route R20. On the other hand, the control unit 100 controls the drive unit 75 to move the colorimetric unit 70 in accordance with the distance between adjacent patch arrays 125. Namely, by this control, the colorimetric unit 70 is moved to the position corresponding to the second patch array 125*b* located just adjacent to the first patch array 125*a* which has been colorimetrically measured in the previous round.

The control unit 100 then conveys the sheet P again through the first conveying route R10 (second-round conveyance). When the sheet P is passed through the colorimetric unit 70 during the second-round conveyance, the colorimetric unit 70 performs the colorimetric process with the second patch array 125*b* which is located just below the colorimetric unit 70. By this process, the colorimetric data (color information) of the six patches 121 contained in the second patch array 125*b* is generated.

The control unit 100 performs the colorimetric measurement of the remaining two patch arrays 125*c* and 125*d* by repeating the above process for these patch arrays 125*c* and 125*d* respectively through the circulation of the sheet P and the lateral motion of the colorimetric unit 70. When the colorimetric measurement is completed for all the patch arrays 125*a* to 125*d* formed on the sheet P, this sheet P is discharged outwards without further circulation.

Thereafter, if another sheet P with the correction chart 120 formed thereon is transferred from the image forming apparatus body 1, the aforementioned process is repeated. In this case, when another sheet P is transferred, the control unit 100 may reset the colorimetric unit 70 to the starting position in advance of repeating the aforementioned process. Alternatively, the control unit 100 may start the colorimetric process for this new sheet P from the position of the fourth patch array 125*d*, where the previous circulation is finished, as a new starting position by controlling the colorimetric unit 70 in a reciprocating motion.

FIG. 5 is an explanatory view for showing the reciprocating motion of the colorimetric unit 70 to repeat the colorimetric process. When a second sheet P is fed anew to the image detection apparatus 2, the control unit 100 does not return the colorimetric unit 70 to the starting position, but leaves the colorimetric unit 70 in the latest colorimetric measuring position (corresponding to the fourth patch array 125*d* of the four patch arrays 125a to 125d) where the previous first sheet P was colorimetrically processed. The control unit 100 then successively performs the colorimetric measurement from the fourth patch arrays 125d to the first patch array 125a while circulating the sheet P and moving the colorimetric unit 70 in correspondence with the positions of the four patch arrays 125a to 125d respectively. When the colorimetric measurement is completed for all the patch arrays 125a to 125d formed on the sheet P, this sheet P is discharged outwards. The colorimetric measurement can be performed in this manner with two sheets P, as described above, while reciprocating the colorimetric unit 70.

When performing the reading process and the colorimetric process described above, the control unit 100 determines the color information of each patch 121 contained in the correction chart 120 based on the read data. The control unit 100 then generates first correction data for correcting error of color characteristics based on the color information of the patches 121 obtained from the read data and target color information which is determined in advance for each patch 121. Next, the control unit 100 performs calibration based on the first correction data and corrects the color characteristics of an image which is formed by the image forming apparatus body 1.

Furthermore, the control unit 100 corrects the output characteristic of the image reading unit 60 based on the colorimetric data. The control unit 100 generates second correction data for correcting the read data output from the image reading unit 60 by comparing the color information of each patch 121 contained in the colorimetric data with the color information of each patch 121 obtained from the read data. When the second correction data is generated, thereafter, the control unit 100 corrects the read data output from the image reading unit 60 based on the second correction data. The control unit 100 then determines the color information of each patch 121 based on the corrected read data. After performing correction based on the second correction data, it is conceived that the color information obtained from the colorimetric data corresponds to the color information obtained from the read data with respect to each patch 121 of the correction chart 120.

The following technique can be used for performing calibration and correction of read data obtained by the image reading unit 60 and obtaining the color information obtained from the read data of each patch 121.

(First Technique) The control unit 100 specifies (segments) an image areas corresponding to each patch 121 and averaging the color information of the area as the color information for use in correction. It is therefore possible to determine the color information from the read data with reliability.

(Second Technique) When the colorimetric process is performed, a sheet P is circulated as has been discussed above. The reading process by the image reading unit 60 is completely performed during the first-round conveyance. However, this reading process can be performed also during the second-round conveyance and/or any subsequent-round conveyance. The color information of each patch 121 can be obtained by repeating the reading process, acquiring a plurality of read data, and averaging the read data. It is therefore possible to determine the color information from the read data with reliability.

As has been discussed above, the image forming apparatus of the present embodiment includes the image forming apparatus body 1, the image detection apparatus 2 and the control unit 100. This image detection apparatus 2 includes the paper conveying unit 50 which conveys a sheet P on which the correction chart 120 is formed, and the colorimetric unit 70 which outputs the color information of the patches 121 contained in each patch array 125 by performing the colorimetric process with the patch array 125 consisting of a line of the patches 121. While circulating a sheet P, the control unit 100 performs switch control for switching the patch array 125 from one to the next to be colorimetrically measured by the colorimetric unit 70.

In accordance with this configuration, a number of patch arrays can be formed on one sheet P, and therefore it is possible to inhibit sheets from being uselessly discarded. Also, it is possible to successively perform the colorimetric process with the patch arrays 125 from one to another on a sheet P by circulating the sheet P and performing the above switch control. It is therefore possible to colorimetrically measure an appropriate number of patches 121 while inhibiting unnecessary sheet discharging.

Furthermore, the control unit 100 of the present embodiment corrects the output characteristic of the image reading unit 60 based on the colorimetric data output from the colorimetric unit 70.

In accordance with this configuration, the output characteristic of the image reading unit 60 can appropriately be corrected by making use of colorimetric data with a high reproducibility of the color information. It is thereby possible to improve the reproducibility of color information with respect to the read data output from the image reading unit 60.

The switch control of the present embodiment successively switches the patch array 125 from one to the next to be colorimetrically measured by the colorimetric unit 70 by moving the colorimetric unit 70 in the sheet width direction. In this case, the control unit 100 moves the colorimetric unit 70 stepwise each time a sheet P is circulated.

In accordance with this configuration, the colorimetric unit 70 is successively moved along the patch arrays so that the colorimetric measurement can be performed with each of the patch arrays formed on a sheet P.

Meanwhile, the patch array is switched not only by moving the colorimetric unit 70 but also by moving a sheet P or by moving both the colorimetric unit 70 and a sheet P.

Furthermore, in the case of the present embodiment as illustrated in FIG. 5, the colorimetric process can be performed by reciprocating the colorimetric unit 70, and therefore the colorimetric unit 70 need not be largely moved to the starting position when colorimetrically processing a new sheet P. The throughput can therefore be improved. Second Embodiment In what follows, the colorimetric process in accordance with the second embodiment will be explained. The colorimetric process of the second embodiment differs from that of the first embodiment as described above in that two or more sheets P are circulated together in a row as a sheet set (arranged side by side in the sheet conveyance direction). Adjacent ones of a sheet set are separated from each other only by a predetermined short distance, e.g., no larger than the width of the sheet. Meanwhile, the second embodiment will be explained mainly with respect to the differences from the first embodiment without repeating redundant description.

The image detection apparatus 2 is capable of not only circulating a single sheet P but also circulating two or more sheets P together as a paper set. Depending on the configuration of the system, the number of sheets P of a paper set (the number of sheets to be circulated together) can take on one or more number. Next, with reference to FIG. 6, the colorimetric process of this embodiment will be explained in the case where sheets P1 and P2 are paired and circulated together as a paper set. In this example shown in the same figure, the correction chart 120 consists of four patch arrays 125a to 125d formed on one side of a sheet and aligned respectively in the sheet conveying direction. Each of the patch arrays 125a to 125d consists of six patches 121 which are aligned with the sheet conveying direction.

First, the control unit 100 sets up the colorimetric unit 70 in a predetermined starting position.

The control unit 100 conveys the two sheets P1 and P2 on the first conveying route R10 (first-round conveyance). In this case, the two sheets P1 and P2 are spaced by a predetermined paper distance. When the first sheet P1 is passed through the colorimetric unit 70, the colorimetric unit 70 performs the colorimetric measurement of the first patch array 125a which is located just below the colorimetric unit 70. Likewise, when the second sheet P2 is passed through the colorimetric unit 70, the colorimetric unit 70 performs the colorimetric measurement of the first patch array 125a which is located just below the colorimetric unit 70. The two sheets P1 and P2 are thereby processed to generate the colorimetric data (color information) of the six patches 121 contained in the first patch array 125a respectively.

The control unit 100 then circulates the two sheets P1 and P2 from the second branch route R22 to the first conveying route R10 through the second conveying route R20. On the other hand, the control unit 100 controls the drive unit 75 to move the colorimetric unit 70 in accordance with the distance between adjacent patch arrays 125. Namely, by this control, the colorimetric unit 70 is moved to the position corresponding to the second patch array 125b located just adjacent to the first patch array 125a.

The control unit 100 then conveys the two sheets P1 and P2 again through the first conveying route R10 (second-round conveyance). When the first sheet P1 is passed through the colorimetric unit 70 during the second-round conveyance, the colorimetric unit 70 performs the colorimetric measurement with the second patch array 125b which is located just below the colorimetric unit 70. Likewise, when the second sheet P2 is passed through the colorimetric unit 70 during the second-round conveyance, the colorimetric unit 70 performs the colorimetric process with the second patch array 125b which is located just below the colorimetric unit 70. By this process, with respect to the two sheets P1 and P2, the colorimetric data (color information) of the six patches 121 contained in the second patch array 125b is generated.

The control unit 100 performs the colorimetric measurement of the remaining two patch arrays 125c and 125d by repeating the above process for these patch arrays 125c and 125d respectively through the circulation of the two sheets P1 and P2 and the lateral motion of the colorimetric unit 70. When the colorimetric measurement is completed for all the patch arrays 125a to 125d formed on the two sheets P1 and P2, these sheets P1 and P2 are discharged outwards.

In accordance with the second embodiment, as has been discussed above, the paper conveying unit 50 is structured to circulate the two sheets P1 and P2 together in a row in accordance with the number of sheets to be circulated together. The control unit 100 performs the switch control of the colorimetric unit 70 each time the number of sheets P to be circulated together are circulated around the re-conveying route.

By this configuration, in the same manner as the first embodiment, it is possible to colorimetrically measure a number of patches 121 while inhibiting unnecessary sheet discharging. Also, since the number of sheets to be circulated together, i.e., the sheets P1 and P2 are continuously circulated, the processing time can be shortened in comparison with the case where sheets P are circulated one after another.

Incidentally, while the number of sheets to be circulated together is two in the case of the present embodiment, the above advantages are effective also in the case where three or more sheets are circulated together.

Furthermore, since the colorimetric unit 70 is moved stepwise, vibration is generated on the colorimetric unit 70 when stopping the motion of the colorimetric unit 70. If the colorimetric measurement is performed while vibration is occurring, the colorimetric accuracy is lowered. For this reason, when a plurality of paper sets are circulated, the control unit 100 controls the sheet interval between the last sheet P2 of a paper set and the first sheet P1 of the subsequent paper set. It is therefore possible to avoid disadvantages in the vibration generating period by adjusting the time interval between conveying the first sheet P1 and conveying the last sheet P2.

Third Embodiment

In what follows, the colorimetric process in accordance with the third embodiment will be explained. The colorimetric process of the third embodiment differs from that of the first embodiment or the second embodiment as described above in that two or more sheets P are circulated together as a sheet set in which the correction chart 120 is divided into portions which are formed separately on the front and back sides of each sheet P respectively. In what follows, the third embodiment will be explained mainly with respect to the differences from the second embodiment without repeating redundant description.

The correction chart 120 of the second embodiment as described above is formed on one side of a sheet P. However, the correction chart 120 can be divided into portions and formed separately on the front and back sides respectively. Next, with reference to FIG. 7, the colorimetric process will be explained in the case where sheets P1 and P2 are paired and circulated together as a paper set while the patch arrays 125 of the correction chart 120 are separately formed on the front and back sides of the sheets P1 and P2. In this example shown in the same figure, the correction chart 120 consists of four patch arrays 125a to 125d aligned respectively in the sheet conveying direction, wherein the two patch arrays 125a and 125c are formed on the main side of a sheet P and the two patch arrays 125b and 125d are formed on the back side of the sheet P.

When the two sheets P1 and P2 are circulated by first-round conveyance in the same manner as in the second embodiment, the colorimetric data (color information) of the six patches 121 contained in the first patch arrays 125a formed on the main side of the sheets P1 and P2 is generated. The control unit 100 conveys the two sheets P1 and P2 to the second branch route R22 through which the two sheets P1 and P2 are circulated/reversed. Specifically, the control unit 100 conveys the sheets P1 and P2 to the switchback route R23 one by one, and conveys the sheets P1 and P2 to the second conveying route R20 after switchback operation. The sheets P1 and P2 are reversed by this process. When the two sheets P1 and P2 have been reversed, the control unit 100 circulates the two sheets P1 and P2 to the first conveying route R10 through the second conveying route R20.

The control unit 100 also controls the drive unit 75 to move the colorimetric unit 70 in accordance with the interval between patch arrays 125 which are located just adjacent to each other on the sheet surface. The colorimetric unit 70 is thereby moved to the position corresponding to the first patch array 125b formed on the back side.

The control unit 100 then conveys the sheets P1 and P2 again through the first conveying route R10. When the first sheet P1 is passed through the colorimetric unit 70 during this conveyance, the colorimetric unit 70 performs the colorimetric process with the first patch array 125*b* which is formed on the back side and located just below the colorimetric unit 70 Likewise, when the second sheet P2 is passed through the colorimetric unit 70, the colorimetric unit 70 performs the colorimetric measurement of the first patch array 125*b* which is formed on the back side and located just below the colorimetric unit 70. By this process, the colorimetric data (color information) of the six patches 121 contained in the first patch array 125*b* formed on the back side of the sheets P1 and P2 is generated respectively.

The control unit 100 also performs the colorimetric measurement of the remaining two patch arrays 125*c* and 125*d* by repeating the above process for these patch arrays 125*c* and 125*d* respectively through the reversal and circulation of the sheets P1 and P2 and the lateral motion of the colorimetric unit 70. When the colorimetric measurement is completed for all the patch arrays 125*a* to 125*d* formed on the both sides of the two sheets P1 and P2, these sheets P1 and P2 are discharged outwards.

As has been discussed above, when circulating the sheets P1 and P2 to be circulated together, the paper conveying unit 50 further performs the operation of reversing the front and back sides of the sheets P1 and P2 respectively.

In accordance with this configuration, even when the patch arrays 125 are formed on the front and back sides of a sheet P, these front and back sides can be colorimetrically processed respectively. By this configuration, it is possible to colorimetrically measure a number of patches 121 while inhibiting unnecessary sheet discharging.

Meanwhile, in accordance with the third embodiment, the front and back sides of the sheets P1 and P2 are reversed each time the sheets P1 and P2 are circulated. However, it is also possible to reverse the sheets P1 and P2 only after completely performing the colorimetric process with all the patch arrays 125 formed on the main sides of the sheets P1 and P2, followed by performing the colorimetric process with all the patch arrays 125 formed on the back sides of the sheets P1 and P2. In this case, when performing the colorimetric process with all the patch arrays 125 formed on the back sides, the colorimetric unit 70 can be moved in the direction opposite to the direction during the colorimetric process with the main sides.

Fourth Embodiment

In what follows, the colorimetric process in accordance with the fourth embodiment will be explained. The colorimetric process of the fourth embodiment differs from that of the second embodiment as described above in that the colorimetric process is performed with patch arrays 125 which are inclined. Meanwhile, the fourth embodiment will be explained mainly with respect to the differences from the second embodiment without repeating redundant description.

The previous embodiments have been described with the patch arrays 125 which are parallelly formed on a sheet P in the sheet conveying direction and the colorimetric unit 70 which is moved stepwise each time the patch array 125 to be colorimetrically measured is switched. However, in the case of the present embodiment, the patch arrays 125 are formed to be inclined in relation to the sheet conveying direction. Next, with reference to FIG. 8, the colorimetric process of this embodiment will be explained in the case where sheets P1 and P2 are paired and circulated together as a paper set. In this example shown in the same figure, four patch arrays, i.e., first to fourth patch arrays 125*a* to 125*d* are formed on a first sheet P1 and inclined to the sheet conveying direction. On the other hand, on a second sheet P2 unlike on the first sheet P1, three patch arrays, i.e., second to fourth patch arrays 125*b* to 125*d* are formed and inclined to the sheet conveying direction, excluding the first patch array 125*a*. Also, when the first sheet P1 and the second sheet P2 are arranged at a predetermined sheet interval for conveying sheets, the positional relationship is such that the first patch array 125*a* of the first sheet P1 is aligned with the second patch array 125*b* of the second sheet P2 in a straight line. This positional relationship is true also in the case of each of the other patch arrays 125*b* to 125*d*.

When the two sheets P1 and P2 are conveyed by first-round conveyance, the control unit 100 sets up the colorimetric unit 70 in a predetermined starting position. The control unit 100 then starts moving the colorimetric unit 70 at a constant speed in synchronization with the conveyance of the two sheets P1 and P2. The colorimetric unit 70 is moved along the first patch array 125*a* when the first sheet P1 is passed through the colorimetric unit 70, and then moved along the second patch array 125*b* when the second sheet P2 is passed through the colorimetric unit 70.

Next, when the two sheets P1 and P2 are conveyed by second-round conveyance, the control unit 100 moves the colorimetric unit 70 in a position of the second patch array 125*b* of the first sheet P1. The control unit 100 then repeats the above operation in synchronization with the conveyance of the two sheets P1 and P2.

In accordance with the first through third embodiments, the colorimetric unit 70 is moved stepwise when the patch array 125 to be measured is switched. Because of this, vibration is generated on the colorimetric unit 70 when stopping the motion of the colorimetric unit 70 so that the colorimetric characteristics are affected by the vibration unless the colorimetric measurement is performed after the vibration has been converged. Taking it into consideration, the patch arrays 125 are formed inclined to the sheet conveying direction. The colorimetric unit 70 is moved along the inclination of the patch arrays 125. The colorimetric unit 70 has been moved to the position corresponding to the second patch array 125*b* when finishing the colorimetric measurement of the first patch array 125*a*, and therefore the colorimetric measurement of the second patch array 125*b* can be started without halting and resuming the motion of the colorimetric unit 70. It is therefore possible to inhibit disadvantages such as vibration caused by quick motion of the colorimetric unit 70.

Fifth Embodiment

In what follows, the colorimetric process in accordance with the fifth embodiment will be explained. The colorimetric process of the fifth embodiment differs from that of the fourth embodiment as described above in that the patch arrays 125 are inclined only of the last sheet P of a paper set. This fifth embodiment will be explained mainly with respect to the differences from the fourth embodiment without repeating redundant description.

In the case of the fourth embodiment, the patch arrays of every sheet of a plurality of sheets, i.e., the sheets P1 and P2 are inclined so that the number of patch arrays 125 formed on each sheet, except the first sheet, has to be decreased from that of the preceding sheet. This reduces the advantages of the image detection apparatus 2 in that the colorimetric process can be performed with a smaller number of sheets P.

Taking it into consideration, in accordance with the present embodiment, only the patch arrays 125 of the last sheet P are inclined among a plurality of sheets P to be continuously circulated. In what follows, with reference to FIG. 9, the colorimetric process of this embodiment will be explained in the case where three sheets P1 to P3 are circulated together as a paper set. In this example shown in the same figure, while it is assumed that three sheets P1 to P3 are circulated, only the third sheet P3 is provided with inclined three patch arrays 125a to 125c.

When the three sheets P1 to P3 are circulated by first-round conveyance, the control unit 100 maintains the colorimetric unit 70 in a predetermined starting position. The colorimetric unit 70 first performs colorimetric measurement of the first patch arrays 125a of the first and second sheets P1 and P2 in the predetermined starting position. Next, the control unit 100 starts moving the colorimetric unit 70 after the second sheet P2 has passed through the colorimetric unit 70 but before the third sheet P3 arrives at the colorimetric unit 70. The control unit 100 then moves the colorimetric unit 70 at a predetermined constant speed to follow the inclination of the first patch array 125a formed on the third sheet P3. The colorimetric unit 70 performs colorimetric measurement of the first patch array 125a of the third sheet P3 which is conveyed through the colorimetric unit 70.

Next, the control unit 100 stops moving the colorimetric unit 70 and starts second-round conveyance of the three sheets P1 to P3. The control unit 100 then repeats the above operation in synchronization with the conveyance of the three sheets P1 to P3.

Meanwhile, in accordance with the technique shown in FIG. 9, the number of patch arrays 125 formed on the last sheet P3 is smaller than that on any other sheet P1 or P2. Hence, in the case where the number of sheets to be circulated together is three (e.g., the three sheets P1 to P3) as illustrated in FIG. 10, the patch arrays 125a to 125d are formed in order to be inclined in opposite directions between adjacent sheets P. In this case, the rear ends of the patch arrays 125a to 125d formed on a preceding sheet P are arranged to correspond to the leading ends of the patch arrays 125a to 125d formed on a subsequent sheet P.

By this configuration, the control unit 100 controls the colorimetric unit 70 to continuously move at a predetermined speed along the inclination of the patch arrays 125 formed also on each of the first sheet P1 and the second sheet P2.

In accordance with the fourth and fifth embodiments, as has been discussed above, the sheets to be circulated together include at least one sheet on which is formed a correction chart 120 including a plurality of patch arrays 125a to 125d which are inclined in relation to the sheet conveying direction. The patch array to be colorimetrically measured is thereby successively switched while continuously moving the colorimetric unit 70 along the inclined patch array 125.

In accordance with this configuration, the process of moving the colorimetric unit 70 to colorimetrically measure the patch array 125 serves also as the process of successively switching the patch array to be colorimetrically measured. It is therefore possible to inhibit the colorimetric unit 70 from stopping when switching the patch array 125 to be colorimetrically measured. As a result, vibration caused by starting and stopping motion of the colorimetric unit 70 can be prevented from occurring.

Sixth Embodiment

The colorimetric unit 70 performs colorimetric process with sheets P while are being conveyed. However, depending upon the accuracy of conveyance, the conveying position of a sheet P can be displaced in the sheet width direction so that the accuracy of positioning the patch arrays 125 may be lowered in relation to the colorimetric unit 70. The control unit 100 thereby detects the conveying position of the sheet P with reference to the read data obtained during first-round conveyance. If there is misalignment in the conveying position of the sheet P, the control unit 100 moves the colorimetric unit 70 in accordance with the misalignment of the sheet P while circulating the sheet P. By this configuration, it is possible to secure alignment between the position of the patch arrays 125 and the position of the colorimetric unit 70 during second-round conveyance.

The foregoing description has been presented based on the image forming apparatus according to the present invention. However, it is not intended to limit the present invention to the precise form described, and obviously many modifications and variations are possible within the scope of the invention. For example, in the embodiment as described above, the image detection apparatus is connected to the image forming apparatus body. However, this image forming apparatus can be incorporated within the image forming apparatus body.

Also, in the embodiment as described above, the viewing angle (measurement range) of the colorimetric unit corresponds to the width of one patch array. However, it is sufficient that the colorimetric unit performs colorimetric measurement of only a part of a plurality of patch arrays formed as a correction chart. Namely, the colorimetric unit may have a viewing angle covering two or more patch arrays.

Furthermore, the image detection apparatus of each of the above embodiment serves as a component of the image forming apparatus, and serves also as a constituent element of the present invention. In this case, the image detection apparatus may be provided with a dedicated control unit for implementing functions thereof.

What is claimed is:

1. An image detection apparatus comprising:
    a paper conveying unit structured to convey a sheet on which a correction chart is formed with a plurality of patch arrays which are arranged in the direction perpendicular to a sheet conveying direction, each of the patch arrays consisting of a plurality of patches which are linearly arranged;
    a colorimetric unit located to face the sheet which is conveyed by the paper conveying unit and structured to perform colorimetric measurement of a part of the plurality of patch arrays of the correction chart and output color information of each patch included in the part of the plurality of patch arrays as colorimetric data; and
    a control unit structured to control the paper conveying unit and the colorimetric unit, wherein
    the paper conveying unit includes a re-conveying route structured to circulate the sheet, which has been passed through the colorimetric unit, to the colorimetric unit again, and wherein
    the control unit is structured to perform switch control for switching the patch array to be colorimetrically measured while circulating the sheet through the re-conveying route.

2. The image detection apparatus of claim 1 further comprising:
    an image reading unit located to face the sheet which is conveyed by the paper conveying unit, and structured to read the sheet and output an image of the correction chart as read data, wherein
    the control unit is structured to correct an output characteristic of the image reading unit based on the colorimetric data which is output from the colorimetric unit.

3. The image detection apparatus of claim 1, wherein
    the paper conveying unit is structured to circulate one or more sheets in a row in accordance with the number of sheets to be circulated together, and wherein the control unit is structured to perform the switch control each time the number of sheets to be circulated together are circulated.

4. The image detection apparatus of claim 3 wherein the paper conveying unit is structured to further perform operation of reversing the front and back sides of each sheet while circulating the sheets to be circulated together.

5. The image detection apparatus of claim 1, wherein the switch control is structured to successively switch the patch array from one to the next to be colorimetrically measured by the colorimetric unit by moving at least either of the colorimetric unit and the sheets in the direction perpendicular to the sheet conveying direction.

6. The image detection apparatus of claim 5, wherein each of the sheets to be circulated together is provided with a correction chart consisting of a plurality of patch arrays parallelly aligned in the sheet conveying direction, and wherein
the control unit is structured to move at least either of the colorimetric unit and the sheets stepwise each time the number of sheets to be circulated together is circulated.

7. The image detection apparatus of claim 6, wherein when repeating a process of successively circulating the number of sheets to be circulated together, the control unit controls the sheet interval between a last sheet and the first sheet that is subsequent to the last sheet.

8. The image detection apparatus of claim 5, wherein of the number of sheets to be circulated together, one or more sheets are provided with a correction chart consisting of a plurality of patch arrays inclined to the sheet conveying direction, and wherein
the control unit is structured to continuously move the colorimetric unit along the inclined patch array to successively switch the patch array to be colorimetrically measured.

9. An image forming apparatus comprising:
an image forming apparatus body structured to form a correction chart on a sheet wherein the correction chart consists of a plurality of patch arrays arranged in the direction perpendicular to a sheet conveying direction, each of the patch arrays consisting of a plurality of patches which are linearly arranged;
an image detection apparatus structured to receive the sheet on which the correction chart is formed from the image forming apparatus body; and
a control unit structured to control the image forming apparatus body and the image detection apparatus, wherein
the image detection apparatus comprises:
a paper conveying unit structured to convey a sheet on which the correction chart is formed; and
a colorimetric unit located to face the sheet which is conveyed by the paper conveying unit and structured to perform colorimetric measurement of a part of the plurality of patch arrays of the correction chart and output color information of each patch included in the part of the plurality of patch arrays as colorimetric data, and wherein
the paper conveying unit includes a re-conveying route structured to circulate the sheet, which has been passed through the colorimetric unit, to the colorimetric unit again, and wherein
the control unit is structured to perform switch control for switching the patch array to be colorimetrically measured while circulating the sheet through the re-conveying route.

10. The image forming apparatus of claim 9 further comprising:
an image reading unit located to face the sheet which is conveyed by the paper conveying unit, and structured to read the sheet and output an image of the correction chart as read data, wherein
the control unit is structured to correct an output characteristic of the image reading unit based on the colorimetric data which is output from the colorimetric unit.

11. The image forming apparatus of claim 10, wherein:
the control unit is structured to determine the color information of each patch based on the read data which is output from the image reading unit, and corrects a color characteristics of the image forming apparatus body based on the determined color information.

12. The image forming apparatus of claim 11, wherein the control unit is structured to specify an image area corresponding to each of the patches and averages color information in the image area as color information of the each patch.

13. The image forming apparatus of claim 10, wherein the image reading unit reads the sheet each time the sheet is circulated through the re-conveying route, and wherein
the control unit is structured to average a plurality of read data acquired in accordance with the number of circulations to determine the color information of each patch.

14. The image forming apparatus of claim 10, wherein the control unit is structured to correct misalignment between the patch array to be colorimetrically measured and the colorimetric unit based on the read data output from the image reading unit.

15. The image forming apparatus of claim 9, wherein the paper conveying unit is structured to circulate one or more sheets in a row in accordance with the number of sheets to be circulated together, and wherein
the control unit is structured to perform the switch control each time the number of sheets to be circulated together are circulated.

16. The image forming apparatus of claim 15, wherein the paper conveying unit is structured to further perform operation of reversing the front and back sides of each sheet while circulating the sheets to be circulated together.

17. The image forming apparatus of claim 9, wherein the switch control is structured to successively switch the patch array from one to the next to be colorimetrically measured by the colorimetric unit by moving at least either of the colorimetric unit and the sheets in the direction perpendicular to the sheet conveying direction.

18. The image forming apparatus of claim 17, wherein each of the sheets to be circulated together is provided with a correction chart consisting of a plurality of patch arrays parallelly aligned in the sheet conveying direction, and wherein
the control unit is structured to move at least either of the colorimetric unit and the sheets stepwise each time the number of sheets to be circulated together is circulated.

19. The image forming apparatus of claim 18, wherein when repeating a process of successively circulating the number of sheets to be circulated together, the control unit controls the sheet interval between a last sheet and the first sheet that is subsequent to the last sheet.

20. The image forming apparatus of claim 17, wherein of the number of sheets to be circulated together, one or more sheets are provided with a correction chart consisting of a plurality of patch arrays inclined to the sheet conveying direction, and wherein the control unit is structured to continuously move the colorimetric unit along the inclined patch array to successively switch the patch array to be colorimetrically measured.

* * * * *